United States Patent
Wang et al.

(10) Patent No.: US 10,914,978 B2
(45) Date of Patent: Feb. 9, 2021

(54) LIQUID CRYSTAL DISPLAY PANEL AND LIQUID CRYSTAL DISPLAY APPARATUS

(71) Applicant: BOE Technology Group Co., Ltd., Beijing (CN)

(72) Inventors: Long Wang, Beijing (CN); Jia Fang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 216 days.

(21) Appl. No.: 15/787,943

(22) Filed: Oct. 19, 2017

(65) Prior Publication Data

US 2018/0275452 A1 Sep. 27, 2018

(30) Foreign Application Priority Data

Mar. 24, 2017 (CN) .......................... 2017 1 0183013

(51) Int. Cl.
G02F 1/1333 (2006.01)
G02F 1/1335 (2006.01)
G02F 1/1334 (2006.01)
G02F 1/1343 (2006.01)

(52) U.S. Cl.
CPC ...... *G02F 1/133512* (2013.01); *G02F 1/1334* (2013.01); *G02F 1/134309* (2013.01); *G02F 2001/13345* (2013.01); *G02F 2001/134318* (2013.01); *G02F 2001/134345* (2013.01)

(58) Field of Classification Search
None
See application file for complete search history.

(56) References Cited

U.S. PATENT DOCUMENTS

| 5,629,783 | A | * | 5/1997 | Kanbara | G02F 1/1334 349/116 |
| 8,064,011 | B2 | * | 11/2011 | Hirato | G02F 1/134336 349/110 |
| 2017/0115540 | A1 | * | 4/2017 | Song | G02F 1/1362 |
| 2018/0217453 | A1 | * | 8/2018 | Li | H01L 27/12 |
| 2019/0361272 | A1 | * | 11/2019 | Yang | G02B 6/0041 |

FOREIGN PATENT DOCUMENTS

WO WO-2017161912 A1 * 9/2017 ........... G02F 1/1334

* cited by examiner

*Primary Examiner* — Richard H Kim
(74) *Attorney, Agent, or Firm* — Westman, Champlin & Koehler, P.A.

(57) ABSTRACT

Embodiments of the present disclosure disclose a liquid crystal display panel and a liquid crystal display apparatus having the same. The liquid crystal display panel includes a first substrate and a second substrate, the first substrate serving as an array substrate; and a polymer liquid crystal layer, the first substrate includes: a plurality of pixel electrodes in display regions, and a plurality of conductors in gaps between adjacent ones of the plurality of pixel electrodes, and the second substrate includes a common electrode; and in areas corresponding to the gaps between adjacent ones of the plurality of pixel electrodes, portions of the polymer liquid crystal layer corresponding to at least zones where the plurality of conductors are located are configured to transmit the input light from the edge-lighting type light source.

16 Claims, 10 Drawing Sheets

LIQUID CRYSTAL DISPLAY PANEL AND LIQUID CRYSTAL DISPLAY APPARATUS

CROSS-REFERENCE TO RELATED APPLICATION

This application claims the benefit of Chinese Patent Application No. 201710183013.0, filed with the State Intellectual Property Office of China on Mar. 24, 2017, the whole disclosure of which is incorporated herein by reference.

BACKGROUND

1. Technical Field

Embodiments of the present disclosure relate to a liquid crystal display panel and a liquid crystal display apparatus.

2. Description of the Related Art

When a polymer-stabilized liquid crystal display panel is applied to a transparent display, generally an edge-lighting type light source is disposed at a side of the liquid crystal display panel, thereby achieving a displaying function.

Generally the liquid crystal display panel comprises: a first substrate and a second substrate which are opposite to each other, the first substrate serving as an array substrate; and a liquid crystal layer between the first substrate and the second substrate. The first substrate comprises: a plurality of pixel electrodes in display regions, and a plurality of conductors in gaps between adjacent ones of the plurality of pixel electrodes. The second substrate comprises a common electrode. The liquid crystal layer comprises liquid crystal molecules and polymer networks. In displaying, voltages are applied to the pixel electrodes and the common electrodes, respectively, so that the liquid crystal molecules corresponding to the display regions are deflected. Orientations of the liquid crystal molecules are disordered under the action of the polymer networks, so that the liquid crystal molecules are irregularly arranged to scatter light emitted from the edge-lighting type light source, thereby achieving a displaying function. However, with the structure of the liquid crystal display panel, the plurality of conductors and the common electrode overlap at overlap regions. Thereby, coupling voltages will be generated at the overlap regions between the plurality of conductors and the common electrode. The liquid crystal molecules corresponding to the overlap regions are irregularly arranged under the action of the coupling voltages to scatter the light emitted from the edge-lighting type light source, thereby decreasing a display contrast and thus adversely affecting display effect.

SUMMARY

Embodiments of the present disclosure provide a liquid crystal display panel comprising:

a first substrate and a second substrate which are opposite to each other, the first substrate serving as an array substrate; and a polymer liquid crystal layer between the first substrate and the second substrate, wherein the first substrate comprises: a plurality of pixel electrodes in display regions, and a plurality of conductors in gaps between adjacent ones of the plurality of pixel electrodes; the second substrate comprises a common electrode; and liquid crystal molecules of the polymer liquid crystal layer corresponding to the display regions are configured to be irregularly arranged when corresponding voltages are applied to the pixel electrodes and the common electrode, respectively, to scatter an input light emitted from an edge-lighting type light source, for displaying image information; and in areas corresponding to the gaps between adjacent ones of the plurality of pixel electrodes, portions of the polymer liquid crystal layer corresponding to at least zones where the plurality of conductors are located are configured to transmit the input light emitted from the edge-lighting type light source.

According to embodiments of the present disclosure, in the liquid crystal display panel according to the embodiments of the present disclosure, in the areas corresponding to the gaps between adjacent ones of the plurality of pixel electrodes, the portions of the polymer liquid crystal layer corresponding to at least the zones where the plurality of conductors are located comprise: liquid crystal molecules oriented parallel to the input light, and polymer networks; and portions of the polymer liquid crystal layer corresponding to the display regions comprise: liquid crystal molecules oriented perpendicular to the input light, and polymer networks.

According to embodiments of the present disclosure, in the liquid crystal display panel according to the embodiments of the present disclosure, in the areas corresponding to the gaps between adjacent ones of the plurality of pixel electrodes, the portions of the polymer liquid crystal layer corresponding to at least the zones where the plurality of conductors are located comprise: liquid crystal molecules regularly arranged and oriented, and photopolymerisable monomer molecules; and portions of the polymer liquid crystal layer corresponding to the display regions comprise: liquid crystal molecules oriented perpendicular to the input light, and polymer networks.

According to embodiments of the present disclosure, in the liquid crystal display panel according to the embodiments of the present disclosure, the liquid crystal molecules regularly arranged and oriented comprise liquid crystal molecules oriented perpendicular to the input light, or liquid crystal molecules oriented parallel to the input light.

According to embodiments of the present disclosure, the liquid crystal display panel according to the embodiments of the present disclosure further comprises: a first ultraviolet ray blocking layer located on a side of the first substrate, wherein an orthogonal projection of the first ultraviolet ray blocking layer on the first substrate covers an orthogonal projection of at least the plurality of conductors on the first substrate; and/or a second ultraviolet ray blocking layer located on a side of the second substrate, wherein an orthogonal projection of the second ultraviolet ray blocking layer on the second substrate covers an orthogonal projection of at least the plurality of conductors on the second substrate.

According to embodiments of the present disclosure, in the liquid crystal display panel according to the embodiments of the present disclosure, the first ultraviolet ray blocking layer is located on a side of the plurality of conductors which faces towards the polymer liquid crystal layer; and/or the second ultraviolet ray blocking layer is located on a side of the second substrate which faces towards the polymer liquid crystal layer.

According to embodiments of the present disclosure, in the liquid crystal display panel according to the embodiments of the present disclosure, a material for the first ultraviolet ray blocking layer comprises one of salicylate, benzophenone, benzotriazole, substituted acrylonitrile, triazine, and hindered amine, or a combination of at least two of salicylate, benzophenone, benzotriazole, substituted acrylonitrile, triazine, and hindered amine; and/or a material for the second ultraviolet ray blocking layer comprises one of salicylate, benzophenone, benzotriazole, substituted acrylonitrile, triazine, and hindered amine, or a combination of at least two of salicylate, benzophenone, benzotriazole, substituted acrylonitrile, triazine, and hindered amine.

According to embodiments of the present disclosure, in the liquid crystal display panel according to the embodiments of the present disclosure, the common electrode has hollowed-out structures in regions corresponding to the plurality of conductors.

According to embodiments of the present disclosure, in the liquid crystal display panel according to the embodiments of the present disclosure, the plurality of conductors comprise first conductors extending in a first direction, and second conductors extending in a second direction;

an orthogonal projection of the common electrode on the first substrate does not overlap an orthogonal projection of the first conductors on the first substrate, and/or the orthogonal projection of the common electrode on the first substrate does not overlap an orthogonal projection of the second conductors on the first substrate.

According to embodiments of the present disclosure, in the liquid crystal display panel according to the embodiments of the present disclosure, the plurality of conductors comprise first conductors extending in a first direction, and second conductors extending in a second direction; and an orthogonal projection of the common electrode on the first substrate does not overlap an orthogonal projection of the first conductors on the first substrate, the orthogonal projection of the common electrode on the first substrate comprises overlap regions at which the orthogonal projection of the common electrode on the first substrate overlaps an orthogonal projection of the second conductors on the first substrate, and each of the overlap regions has blocky structures distributed uniformly at intervals; and/or an orthogonal projection of the common electrode on the first substrate does not overlap an orthogonal projection of the second conductors on the first substrate, the orthogonal projection of the common electrode on the first substrate comprises overlap regions at which the orthogonal projection of the common electrode on the first substrate overlaps an orthogonal projection of the first conductors on the first substrate, and each of the overlap regions has blocky structures distributed uniformly at intervals.

According to embodiments of the present disclosure, in the liquid crystal display panel according to the embodiments of the present disclosure, the liquid crystal display panel comprises a transparent liquid crystal display panel.

According to embodiments of the present disclosure, in the liquid crystal display panel according to the embodiments of the present disclosure, a material for the plurality of conductors comprises a transparent electrically-conductive material.

According to embodiments of the present disclosure, the liquid crystal display panel according to the embodiments of the present disclosure further comprises: a first light blocking layer located on a side of the plurality of conductors which faces towards the first substrate; and a second light blocking layer located on a side of the plurality of conductors which faces towards the polymer liquid crystal layer, wherein an orthogonal projection of each of the first light blocking layer and the second light blocking layer on the first substrate covers an orthogonal projection of at least the plurality of conductors on the first substrate.

According to embodiments of the present disclosure, in the liquid crystal display panel according to the embodiments of the present disclosure, the first direction is perpendicular to the second direction.

According to embodiments of the present disclosure, in the liquid crystal display panel according to the embodiments of the present disclosure, the overlap regions of the orthogonal projection of the common electrode on the first substrate, at which the orthogonal projection of the common electrode on the first substrate overlaps the orthogonal projection of the second conductors on the first substrate, have a total area that is less than an area of the orthogonal projection of the second conductors on the first substrate; and/or the overlap regions of the orthogonal projection of the common electrode on the first substrate, at which the orthogonal projection of the common electrode on the first substrate overlaps the orthogonal projection of the first conductors on the first substrate, have a total area that is less than an area of the orthogonal projection of the first conductors on the first substrate.

Embodiments of the present disclosure also provide a liquid crystal display apparatus comprising the liquid crystal display panel according to any one of the embodiments of the present disclosure.

According to embodiments of the present disclosure, in the liquid crystal display apparatus according to the embodiments of the present disclosure, the polymer liquid crystal layer of the liquid crystal display panel has four sides, and the liquid crystal display apparatus further comprises an edge-lighting type collimated light source located on at least one of the four sides of the polymer liquid crystal layer.

DETAILED DESCRIPTION OF THE EMBODIMENTS

Figure 1:
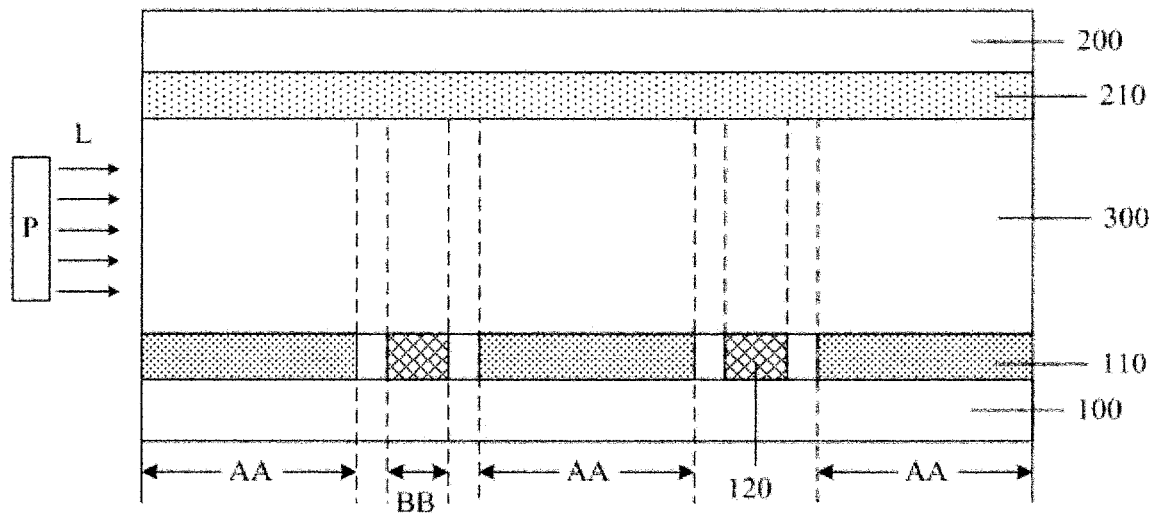
FIG. 1 is a schematic sectional view showing a structure of a liquid crystal display panel according to an embodiment of the present disclosure.

In order that the object, technical solutions and advantages of the present invention are more apparent, a clear and detailed description of a liquid crystal display panel and a liquid crystal display apparatus according to embodiments of the present disclosure will be further made as below in conjunction with the accompanying drawings. It should be understood that the embodiments set forth herein are only used to describe and explain the present invention and are not intended to limit the present invention. Furthermore, the embodiments of the present disclosure may be combined with each other unless they conflict and the features in the embodiments of the present disclosure may be combined with each other unless they conflict.

In the drawings, all of a thickness, a size and a shape of the films do not reflect a real scale of the liquid crystal display panel, and the only purpose is to schematically show contents of the present disclosure.

Embodiments of the present disclosure provide a liquid crystal display panel. As shown in FIG. 1, the liquid crystal display panel comprises: a first substrate 100 and a second substrate 200 which are opposite to each other; and a polymer liquid crystal layer 300 between the first substrate 100 and the second substrate 200. The first substrate 100 serves as an array substrate. The first substrate 100 comprises: a plurality of pixel electrodes 110 in display regions AA, and a plurality of conductors 120 in gaps between adjacent ones of the plurality of pixel electrodes 110, and the second substrate 200 comprises a common electrode 210. Liquid crystal molecules of the polymer liquid crystal layer 300 corresponding to the display regions AA are configured to be irregularly arranged when corresponding voltages are applied to the pixel electrodes 110 and the common electrode 210, respectively, to scatter an input light L emitted from an edge-lighting type light source P, for displaying image information.

In areas corresponding to the gaps between adjacent ones of the plurality of pixel electrodes 110, portions of the polymer liquid crystal layer 300 corresponding to at least zones BB where the plurality of conductors 120 are located are configured to transmit the input light L emitted from the edge-lighting type light source P.

In an embodiment of the present disclosure, the conductors 120 may be signal wires or drive wires configured to drive thin film transistors for sub-pixels. The display regions AA correspond to the sub-pixels, and the conductors 120 are located between the sub-pixels.

With the liquid crystal display panel according to the embodiments of the present disclosure, the liquid crystal molecules of the polymer liquid crystal layer corresponding to the display regions can be irregularly arranged when the corresponding voltages are applied to the pixel electrodes and the common electrode, respectively, to scatter the input light emitted from the edge-lighting type light source, for displaying the image information. Furthermore, in the areas corresponding to the gaps between adjacent ones of the plurality of pixel electrodes, the portions of the polymer liquid crystal layer corresponding to at least the zones where the plurality of conductors are located can transmit the input light emitted from the edge-lighting type light source. Therefore, the input light can pass through the portions of the polymer liquid crystal layer corresponding to at least the zones, and enters the portions of the polymer liquid crystal layer corresponding to the display regions. As a result, scattering of the input light is avoided, and more input light is used for achieving a displaying function in the display regions, thereby improving a display contrast and thus a display effect.

Figure 2A:
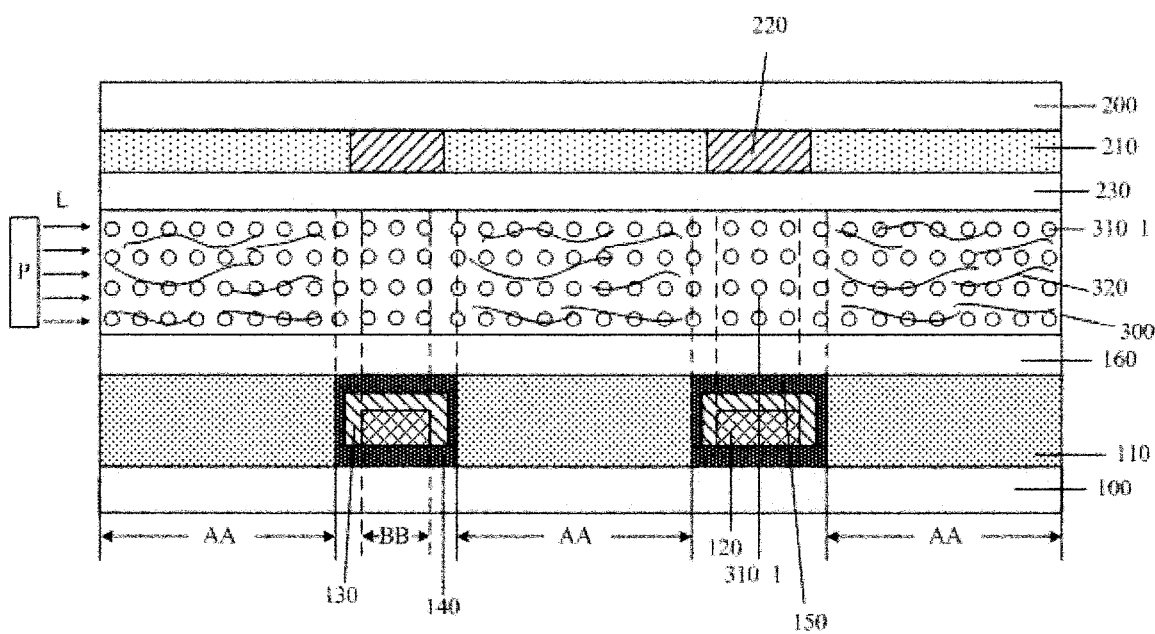
FIG. 2a is a schematic sectional view showing a specific structure of a liquid crystal display panel according to an embodiment of the present disclosure.
Figure 2B:
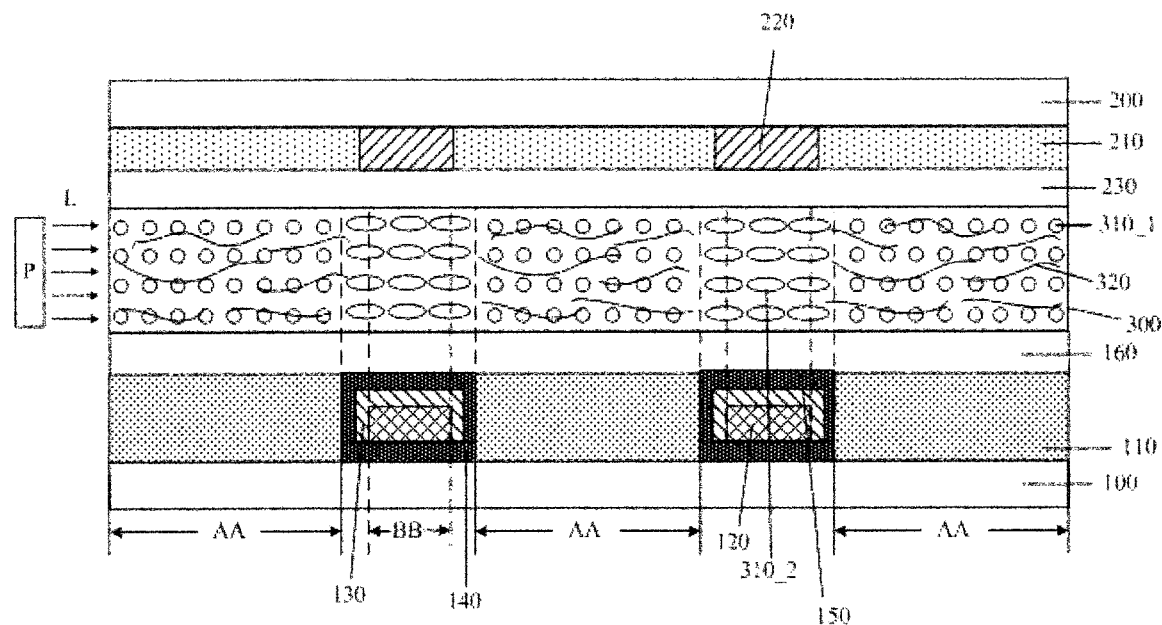
FIG. 2b is a schematic sectional view showing a specific structure of a liquid crystal display panel according to another embodiment of the present disclosure.

Generally, the polymer networks in the polymer liquid crystal layer are formed by polymerizing photopolymerisable monomer molecules by ultraviolet ray excitation. Therefore, in a specific implementation, in the liquid crystal display panel according to the embodiments of the present disclosure, as shown in FIG. 2a and FIG. 2b, in the areas corresponding to the gaps between adjacent ones of the plurality of pixel electrodes 110, the portions of the polymer liquid crystal layer 300 corresponding to at least the zones BB where the plurality of conductors 120 are located may specifically comprise: liquid crystal molecules $310\_m$ (where m is 1 or 2, $310\_1$ denotes liquid crystal molecules oriented perpendicular to the input light L, and $310\_2$ denotes liquid crystal molecules oriented parallel to the input light L) regularly arranged and oriented, and photopolymerisable monomer molecules.

Portions of the polymer liquid crystal layer 300 corresponding to the display regions AA may specifically comprise: liquid crystal molecules $310\_1$ oriented perpendicular to the input light L, and polymer networks 320. In other words, a direction of a major axis of each of the liquid crystal molecules $310\_1$ is perpendicular to the input light L. In this way, there is no polymer network in at least the zones BB where the plurality of conductors 120 are located. Therefore, even if coupling voltages exist in the zones, the liquid crystal molecules will not be disordered, so that the zones can transmit most of light. A situation where the input light is apparently scattered out will not be caused, thereby facilitating improvement of the contrast. In addition, under the influence of the polymer networks, the liquid crystal molecules have a short response time, which can be up to about 1 ms-2 ms.

In a manufacturing process of the liquid crystal display panel, generally a liquid crystal cell having a thickness in the range of 2 μm-10 μm, for example in the range of 3 μm-6 μm, is formed by assembling. After an original liquid crystal mixture including liquid crystal molecules, photopolymerisable monomer molecules (for example, monomer including propenyl) and photoinitiator is injected into the assembled liquid crystal cell, an ultraviolet irradiation process is performed. In the ultraviolet irradiation process, a corresponding mask may be used so that photopolymerisable monomer molecules in the display regions are formed into polymer networks, while photopolymeris able monomer molecules in at least the zones where the conductors are located are not formed into polymer networks. Finally, a stable polymer liquid crystal layer is formed. In the original liquid crystal mixture, the photopolymerisable monomer molecules need to have good compatibility with the liquid crystal molecules, and generally a ratio of a volume of the photopolymerisable monomer molecules to a volume of the original liquid crystal mixture is less than or equal to 10%. According to embodiments of the present disclosure, the ratio of the volume of the photopolymerisable monomer molecules to the volume of the original liquid crystal mixture is in the range of 3%-9%. A material having a large dielectric constant is used for the liquid crystal molecules.

In actual application, since it is necessary to insulate the conductors and the pixel electrodes from one another, there are also gaps between the conductors and the pixel electrodes, so that light is also probably scattered out from regions corresponding to the gaps. Furthermore, in order to guarantee an aperture ratio of the liquid crystal display panel, in the areas corresponding to the gaps between adjacent ones of the plurality of pixel electrodes, each of the regions, where the liquid crystal molecules regularly arranged and oriented and the photopolymerisable monomer molecules are located, has a width that is 1-3 times as large as a width of each of the conductors. Of course, in actual application, a relationship between the width of each of the regions where the liquid crystal molecules regularly arranged and oriented and the photopolymerisable monomer molecules are located and the width of each of the conductors needs to be designed and determined according to actual conditions, and is not limited to those described in the embodiments of the present disclosure.

Generally, the liquid crystal molecules are oriented perpendicular to the input light, or are oriented parallel to the input light. In a specific implementation, in the liquid crystal display panel according to the embodiments of the present disclosure, as shown in FIG. 2a, the liquid crystal molecules regularly arranged may specifically comprise liquid crystal molecules 310_1 oriented perpendicular to the input light L. In other words, the direction of the major axis of each of the liquid crystal molecules 310_1 is perpendicular to the input light L. In practical applications, as shown in FIG. 2a, the liquid crystal molecules 310_1 oriented perpendicular to the input light L may be oriented parallel to the first substrate 100. In other words, the direction of the major axis of each of the liquid crystal molecules 310_1 is perpendicular to the input light L and is parallel to the first substrate 100. Of course, the liquid crystal molecules oriented perpendicular to the input light may also be oriented perpendicular to the first substrate. In other words, the direction of the major axis of each of the liquid crystal molecules is perpendicular to the input light L and is perpendicular to the first substrate. The direction of the major axis of each of the liquid crystal molecules is not limited to those described in the embodiments.

Alternatively, as shown in FIG. 2b, the liquid crystal molecules regularly arranged may specifically comprise liquid crystal molecules 310_2 oriented parallel to the input light L. In other words, a direction of a major axis of each of the liquid crystal molecules 310_2 is along the input light L. Of course, the liquid crystal molecules regularly arranged may also specifically comprise liquid crystal molecules oriented at an angle, which is greater than 0° and less than 90°, to the input light. In actual applications, a specific direction in which the liquid crystal molecules are oriented needs to be determined according to an actual application environment, and is not limited to those described in the embodiments of the present disclosure.

In actual use, the photopolymerisable monomer molecules are probably excited to be formed into polymer networks by ultraviolet ray of ambient light in which the liquid crystal display panel is located. Therefore, in order to avoid an adverse effect caused by the ultraviolet ray of the ambient light, in a specific implementation, as shown in FIG. 2a and FIG. 2b, the liquid crystal display panel according to the embodiments of the present disclosure may further comprise: a first ultraviolet ray blocking layer 130 located on a side of the first substrate 100. An orthogonal projection of the first ultraviolet ray blocking layer 130 on the first substrate 100 covers an orthogonal projection of at least the plurality of conductors 120 on the first substrate 100. In a specific implementation, the first ultraviolet ray blocking layer 130 may be specifically located on a side of the plurality of conductors 120 which faces towards the polymer liquid crystal layer 300. Of course, the first ultraviolet ray blocking layer may also be located on a side of the plurality of conductors which faces towards the first substrate. For example, the first ultraviolet ray blocking layer may be located between the first substrate and the plurality of conductors, or may also be located on a side of the first substrate facing away from the plurality of conductors. Location of the first ultraviolet ray blocking layer is not limited to those described in the embodiments of the present disclosure. Alternatively, in a specific implementation, as shown in FIG. 2a and FIG. 2b, the liquid crystal display panel according to the embodiments of the present disclosure may further comprise: a second ultraviolet ray blocking layer 220 located on a side of the second substrate 200. An orthogonal projection of the second ultraviolet ray blocking layer 220 on the second substrate 200 covers an orthogonal projection of at least the plurality of conductors 120 on the second substrate 200. In a specific implementation, the second ultraviolet ray blocking layer 220 may be located on a side of the second substrate 200 which faces towards the polymer liquid crystal layer 300. Of course, the second ultraviolet ray blocking layer may also be located on a side of the second substrate which faces away from the polymer liquid crystal layer. Location of the second ultraviolet ray blocking layer is not limited to those described in the embodiments. The first ultraviolet ray blocking layer 130 or the second ultraviolet ray blocking layer 220 can block ultraviolet ray. Therefore, in the ultraviolet irradiation process, the first ultraviolet ray blocking layer 130 or the second ultraviolet ray blocking layer 220 may serve as a mask, thereby saving an additional mask for the ultraviolet irradiation process and thus reducing production cost.

In embodiments of the present disclosure, in order to better prevent an adverse effect of the ambient light on the photopolymerisable monomer molecules, in a specific implementation, as shown in FIG. 2a and FIG. 2b, the liquid crystal display panel according to the embodiments of the present disclosure may further comprise: a first ultraviolet ray blocking layer 130 located on a side of the first substrate 100, and a second ultraviolet ray blocking layer 220 located on a side of the second substrate 200. An orthogonal projection of the first ultraviolet ray blocking layer 130 on the first substrate 100 covers an orthogonal projection of at least the plurality of conductors 120 on the first substrate 100. An orthogonal projection of the second ultraviolet ray blocking layer 220 on the second substrate 200 covers an orthogonal projection of at least the plurality of conductors 120 on the second substrate 200. In a specific implementation, the first ultraviolet ray blocking layer 130 is located on a side of the plurality of conductors 120 which faces towards the polymer liquid crystal layer 300, and the second ultraviolet ray blocking layer 220 is located on a side of the second substrate 200 which faces towards the polymer liquid crystal layer 300.

In embodiments of the present disclosure, in a specific implementation, in the liquid crystal display panel according to the embodiments of the present disclosure, the first ultraviolet ray blocking layer has a width that is 1-3 times as large as a width of each of the conductors, and the second ultraviolet ray blocking layer has a width that is 1-3 times as large as a width of each of the conductors.

In a specific implementation, in the liquid crystal display panel according to the embodiments of the present disclosure, a material for the first ultraviolet ray blocking layer may specifically comprise one of salicylate, benzophenone, benzotriazole, substituted acrylonitrile, triazine, and hindered amine, or a combination of at least two of salicylate, benzophenone, benzotriazole, substituted acrylonitrile, triazine, and hindered amine, or a material for the second ultraviolet ray blocking layer may specifically comprise one of salicylate, benzophenone, benzotriazole, substituted acrylonitrile, triazine, and hindered amine, or a combination of at least two of salicylate, benzophenone, benzotriazole, substituted acrylonitrile, triazine, and hindered amine. These materials have an ultraviolet ray absorbing function. When the first ultraviolet ray blocking layer or the second ultraviolet ray blocking layer is actually manufactured, one or more of these materials may be mixed into a material such as polymethyl methacrylate, polyimide and the like, and the first ultraviolet ray blocking layer or the second ultraviolet ray blocking layer is formed by a patterning process. The patterning process may comprise only a photolithographic process, or may comprise the photolithographic process and an etching step, and may further comprise other processes for forming a predetermined pattern, such as a printing process, an ink-jetting process, an evaporation process, or the like. The photolithographic process is a process which includes steps such as a film forming process, an exposure, a development, and the like, and which is used for forming a pattern by a photoresist, a mask, an exposing machine and the like. In a specific implementation, a corresponding patterning process may be selected according to a structure to be formed in the present disclosure.

In embodiments of the present disclosure, in order that the same material is used, in a specific implementation, in the liquid crystal display panel according to the embodiments of the present disclosure, a material for the first ultraviolet ray blocking layer may specifically comprise one of salicylate, benzophenone, benzotriazole, substituted acrylonitrile, triazine, and hindered amine, or a combination of at least two of salicylate, benzophenone, benzotriazole, substituted acrylonitrile, triazine, and hindered amine, and a material for the second ultraviolet ray blocking layer may specifically comprise one of salicylate, benzophenone, benzotriazole, substituted acrylonitrile, triazine, and hindered amine, or a combination of at least two of salicylate, benzophenone, benzotriazole, substituted acrylonitrile, triazine, and hindered amine.

Figure 2C:
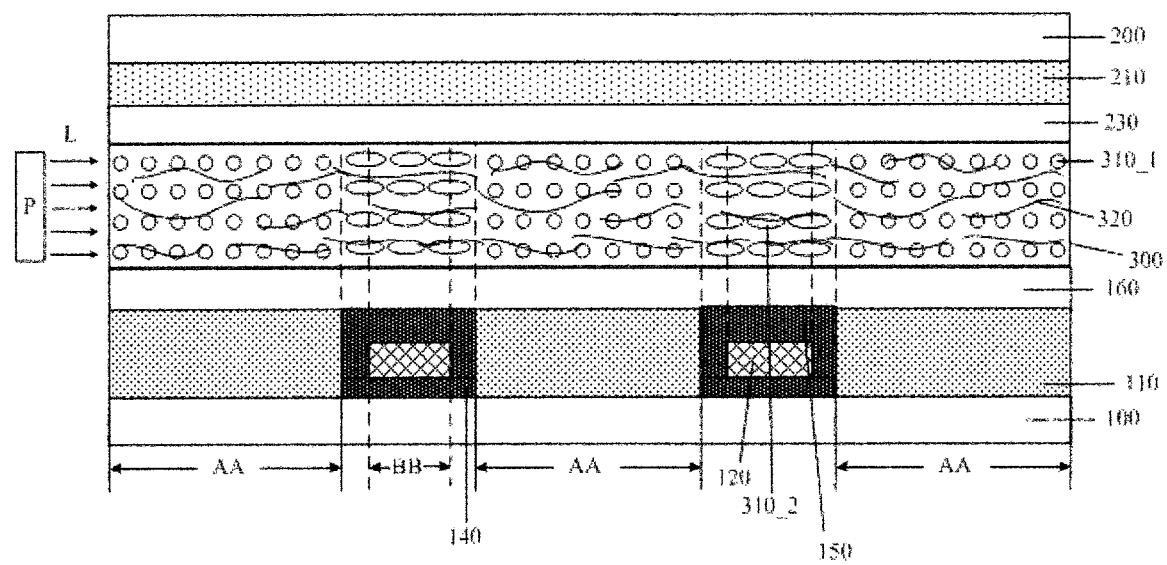
FIG. 2c is a schematic sectional view showing a specific structure of a liquid crystal display panel according to a further embodiment of the present disclosure.

Of course, the display contrast may not only be improved by avoiding formation of the polymer networks, but may also be improved by adjusting orientations of the liquid crystal molecules. In a specific implementation, in the liquid crystal display panel according to the embodiments of the present disclosure, as shown in FIG. 2c, in the areas corresponding to the gaps between adjacent ones of the plurality of pixel electrodes 110, the portions of the polymer liquid crystal layer 300 corresponding to at least the zones BB where the plurality of conductors 120 are located may specifically comprise: liquid crystal molecules 310_2 oriented parallel to the input light L, and polymer networks 320. In other words, a direction of a major axis of each of the liquid crystal molecules 310_2 is along the input light L. Portions of the polymer liquid crystal layer 300 corresponding to the display regions AA may specifically comprise: liquid crystal molecules 310_1 oriented perpendicular to the input light L, and polymer networks 320. In other words, a direction of a major axis of each of the liquid crystal molecules 310_1 is perpendicular to the input light L. In the ultraviolet irradiation process, the entire liquid crystal display panel may be directly irradiated without provision of any additional mask, so that the polymer networks are formed in the entire liquid crystal display panel. In addition, the ultraviolet ray blocking layer also may not be provided, thereby reducing the number of process steps and thus reducing production cost. Although the portions of the polymer liquid crystal layer 300 corresponding to at least the zones BB where the plurality of conductors 120 are located comprise the polymer networks 320, it was detected by test that an amount of light scattered out from the zones BB is less by one or more orders of magnitude than an amount of light scattered out by the liquid crystal molecules oriented perpendicular to the input light L, so that most of the input light is transmitted. Therefore, even if light is scattered out from the zones BB, an intensity of the light is low, thereby exerting little influence on reduction of the contrast. As a result, the display contrast can be improved.

In actual applications, as shown in FIG. 2c, the liquid crystal molecules 310_1 oriented perpendicular to the input light L may be oriented parallel to the first substrate 100. In other words, the direction of the major axis of each of the liquid crystal molecules 310_1 is perpendicular to the input light L and is parallel to the first substrate 100. Of course, the liquid crystal molecules oriented perpendicular to the input light may also be oriented perpendicular to the first substrate. In other words, the direction of the major axis of each of the liquid crystal molecules 310_1 is perpendicular to the input light L and is perpendicular to the first substrate. The direction of the major axis of each of the liquid crystal molecules is not limited to those described in the embodiments.

In actual applications, since it is necessary to insulate the conductors and the pixel electrodes from one another, there are also gaps between the conductors and the pixel electrodes, so that light is also probably scattered out. Furthermore, in order to guarantee an aperture ratio of the liquid crystal display panel, in a specific implementation, in the liquid crystal display panel according to the embodiments of the present disclosure, in the areas corresponding to the gaps between adjacent ones of the plurality of pixel electrodes, each of the regions, where the liquid crystal molecules oriented parallel to the input light and the polymer networks are located, has a width that is 2-4 times as large as a width of each of the conductors. Of course, in actual application, a relationship between the width of each of the regions where the liquid crystal molecules oriented parallel to the input light and the polymer networks are located and the width of each of the conductors needs to be designed and determined according to actual conditions, and is not limited to those described in the embodiments of the present disclosure.

Furthermore, in order to alleviate the problem that light is scattered out from the zones where the conductors are located, in a specific implementation, in the liquid crystal display panel according to the embodiments of the present disclosure, the common electrode has hollowed-out structures in its regions corresponding to the plurality of conductors. In this way, the overlap regions where the plurality of conductors and the common electrode overlap can be reduced as far as possible within allowable ranges of a resistance and a voltage drop.

Figure 3A:
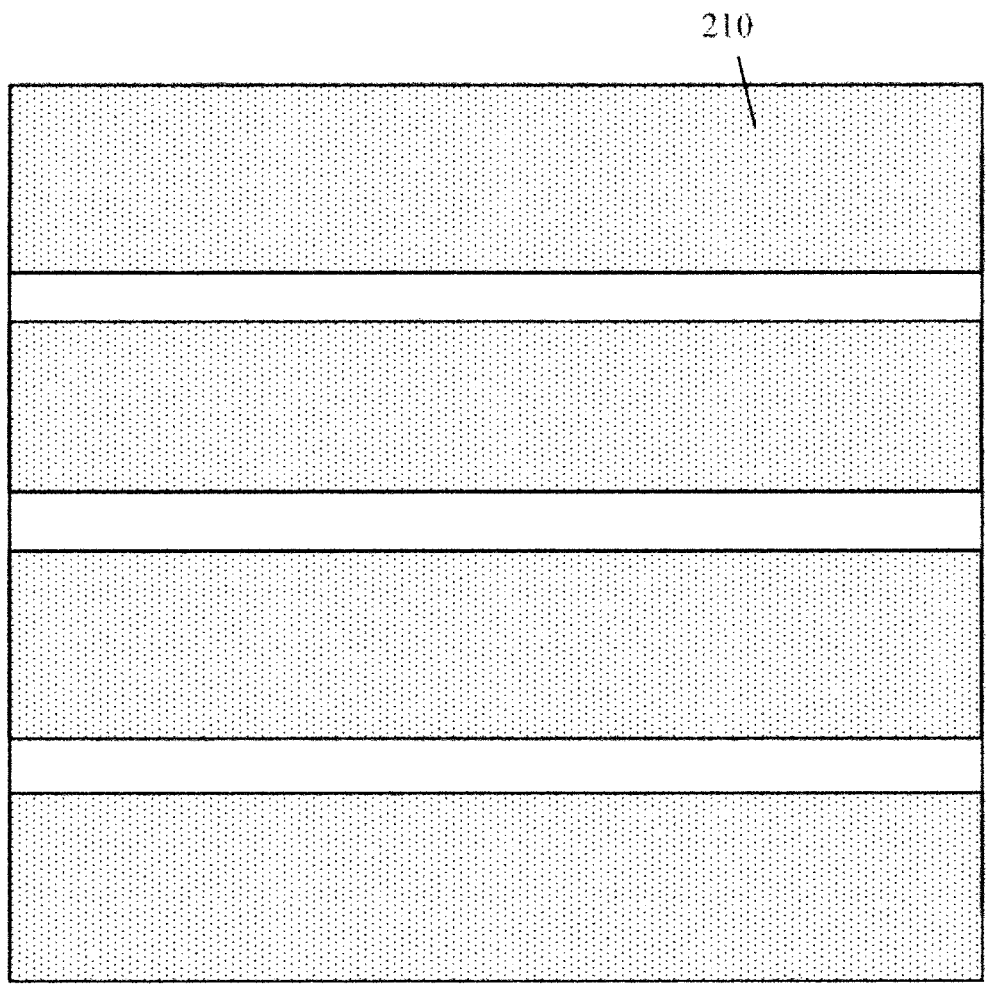
FIG. 3a is a schematic top view of a common electrode according to an embodiment of the present disclosure.

In a specific implementation, in the liquid crystal display panel according to the embodiments of the present disclosure, as shown in FIG. 3a, the plurality of conductors comprise first conductors extending in a first direction and second conductors extending in a second direction; and an orthogonal projection of the common electrode 210 on the first substrate does not overlap an orthogonal projection of the first conductors on the first substrate. The first direction is different from the second direction. The first direction may be a row direction, while the second direction may be a column direction. For example, the first direction is perpendicular to the second direction.

Figure 3B:
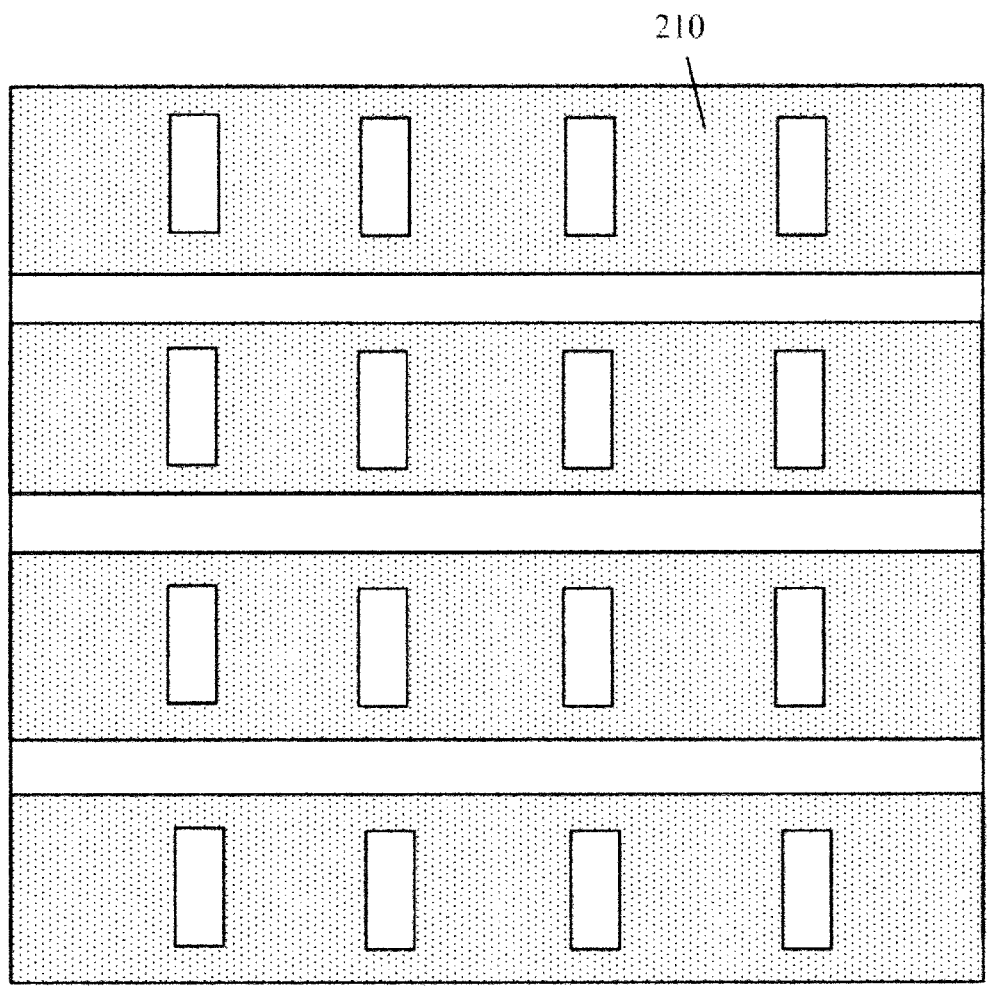
FIG. 3b is a schematic top view of a common electrode according to another embodiment of the present disclosure.
Figure 3C:
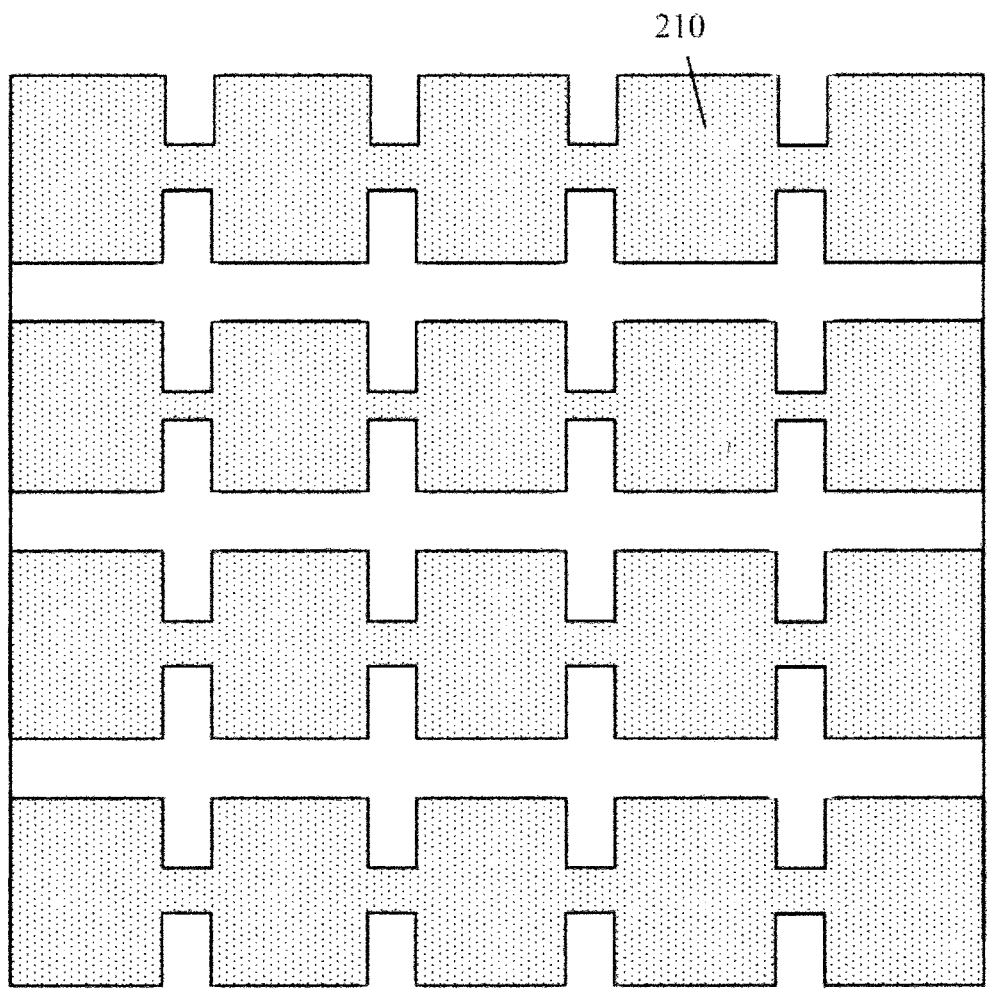
FIG. 3c is a schematic top view of a common electrode according to a further embodiment of the present disclosure.
Figure 3D:
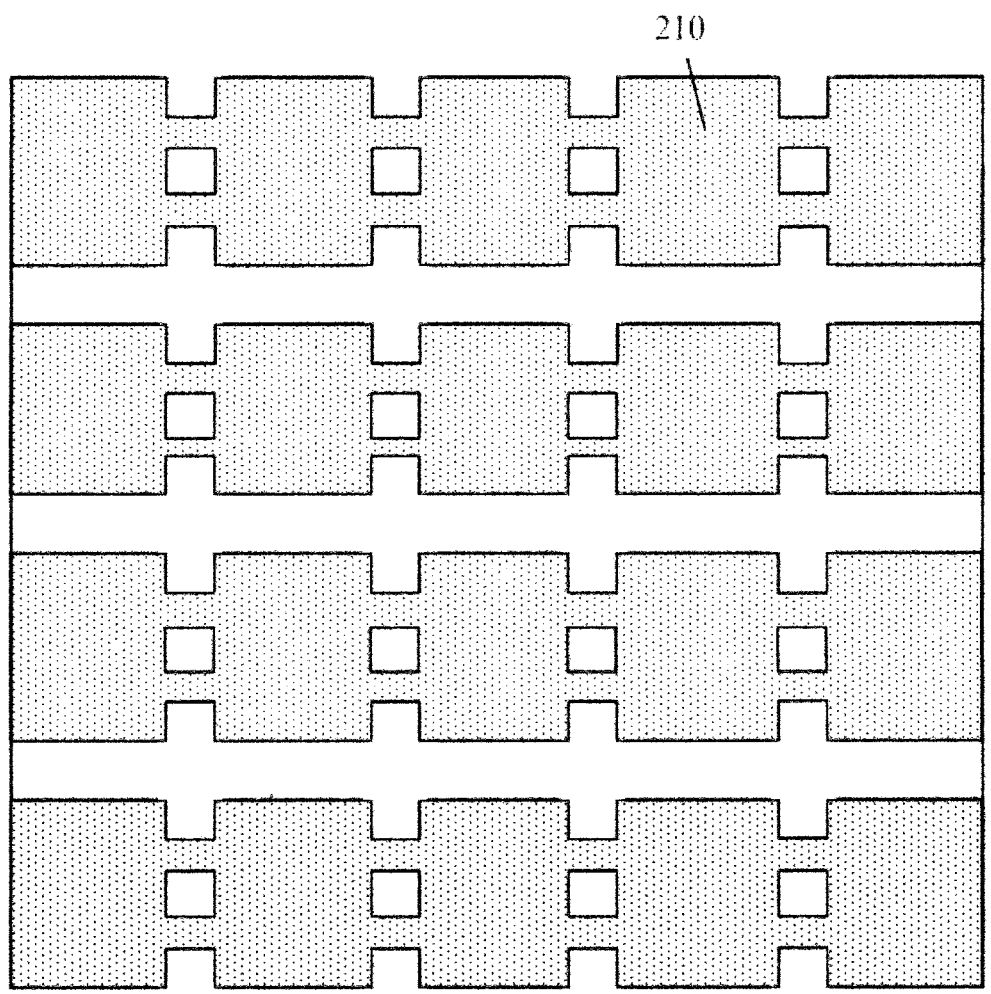
FIG. 3d is a schematic top view of a common electrode according to still another embodiment of the present disclosure.

In a specific implementation, in the liquid crystal display panel according to the embodiments of the present disclosure, as shown in FIG. 3b to FIG. 3d, an orthogonal projection of the common electrode 210 on the first substrate does not overlap an orthogonal projection of the first conductors on the first substrate, the orthogonal projection of the common electrode 210 on the first substrate comprises overlap regions at which the orthogonal projection of the common electrode on the first substrate overlaps an orthogonal projection of the second conductors on the first substrate, and each of the overlap regions has blocky structures distributed uniformly at intervals. The overlap regions of the orthogonal projection of the common electrode on the first substrate, at which the orthogonal projection of the common electrode on the first substrate overlaps the orthogonal projection of the second conductors on the first substrate, have a total area that is less than an area of the orthogonal projection of the second conductors on the first substrate. Of course, alternatively, the orthogonal projection of the common electrode on the first substrate does not overlap the orthogonal projection of the second conductors on the first substrate. Arrangement and configuration of the common electrode are not limited to those described in the embodiments.

Figure 4A:
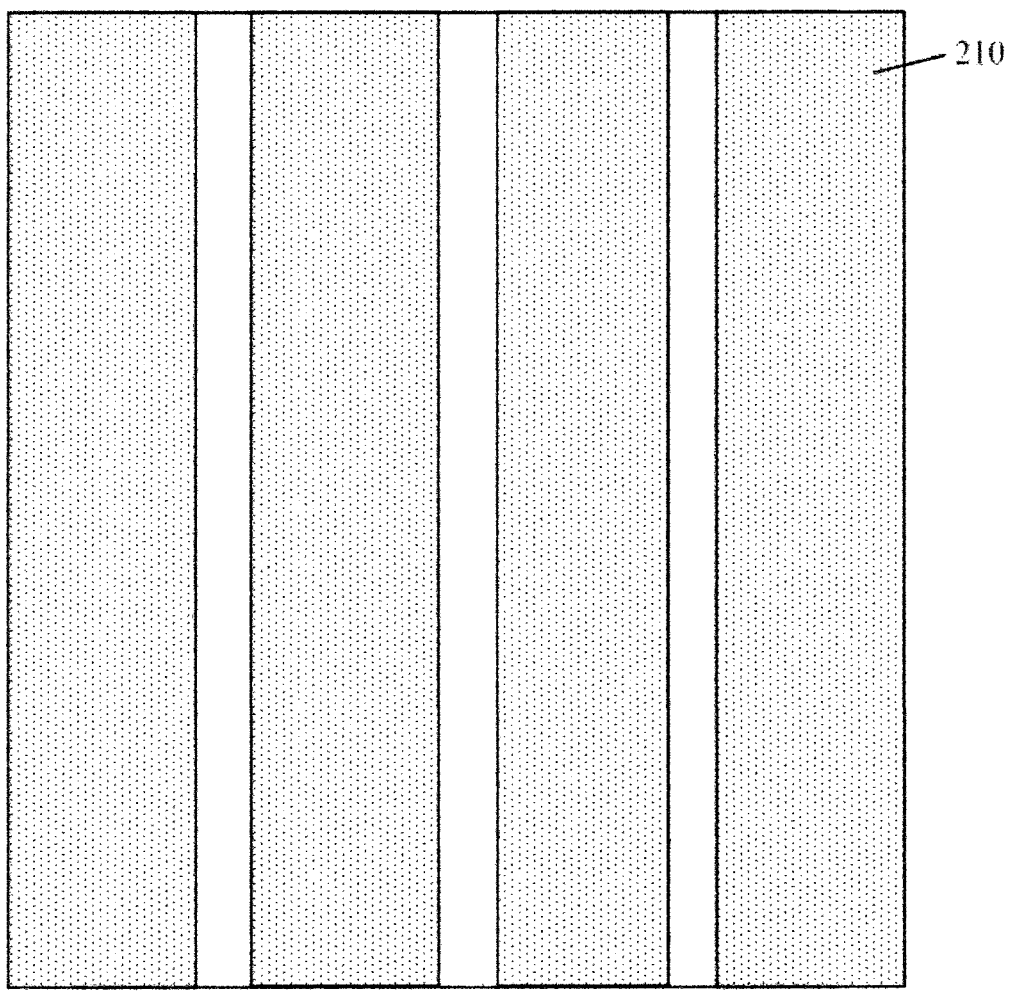
FIG. 4a is a schematic top view of a common electrode according to an embodiment of the present disclosure.

In a specific implementation, in the liquid crystal display panel according to the embodiments of the present disclosure, as shown in FIG. 4a, the plurality of conductors comprise first conductors extending in a first direction and second conductors extending in a second direction; and the orthogonal projection of the common electrode 210 on the first substrate does not overlap the orthogonal projection of the second conductors on the first substrate. The first direction is different from the second direction. The first direction may be a row direction, while the second direction may be a column direction.

Figure 4B:
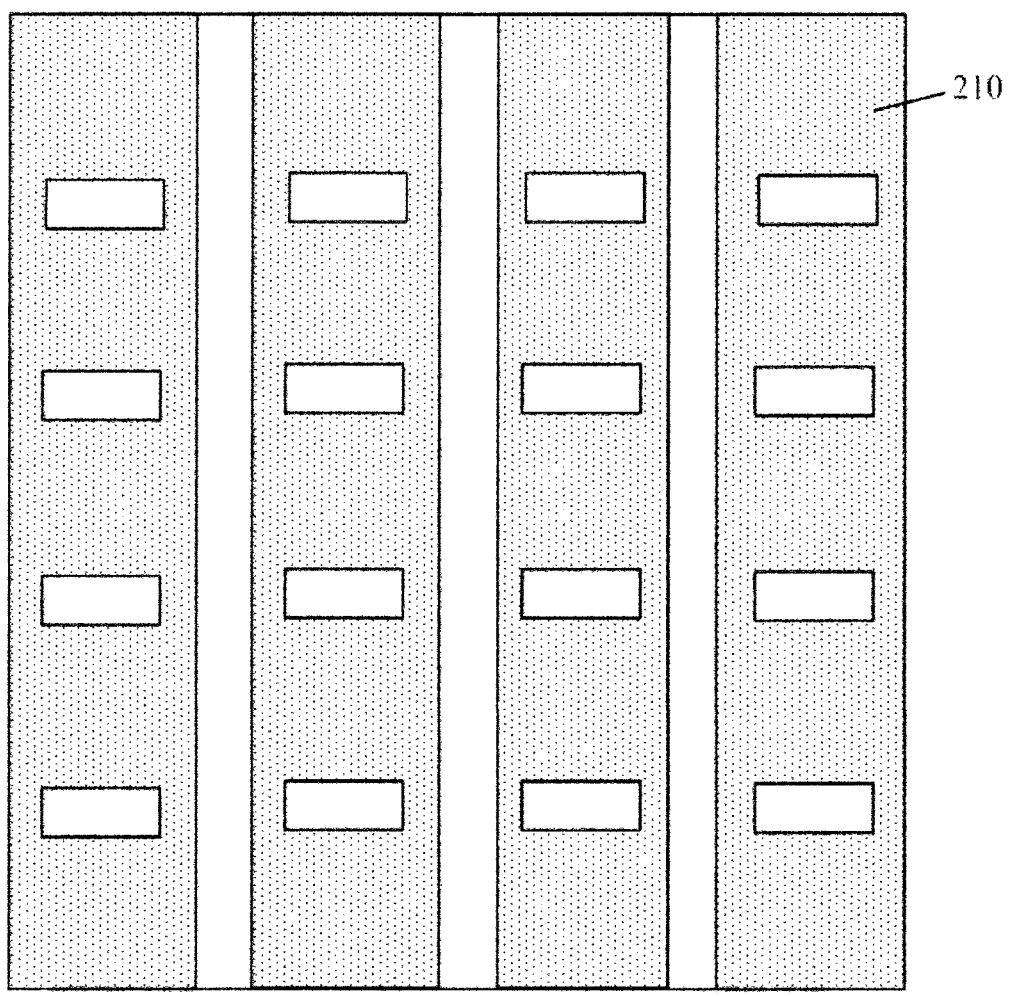
FIG. 4b is a schematic top view of a common electrode according to another embodiment of the present disclosure.
Figure 4C:
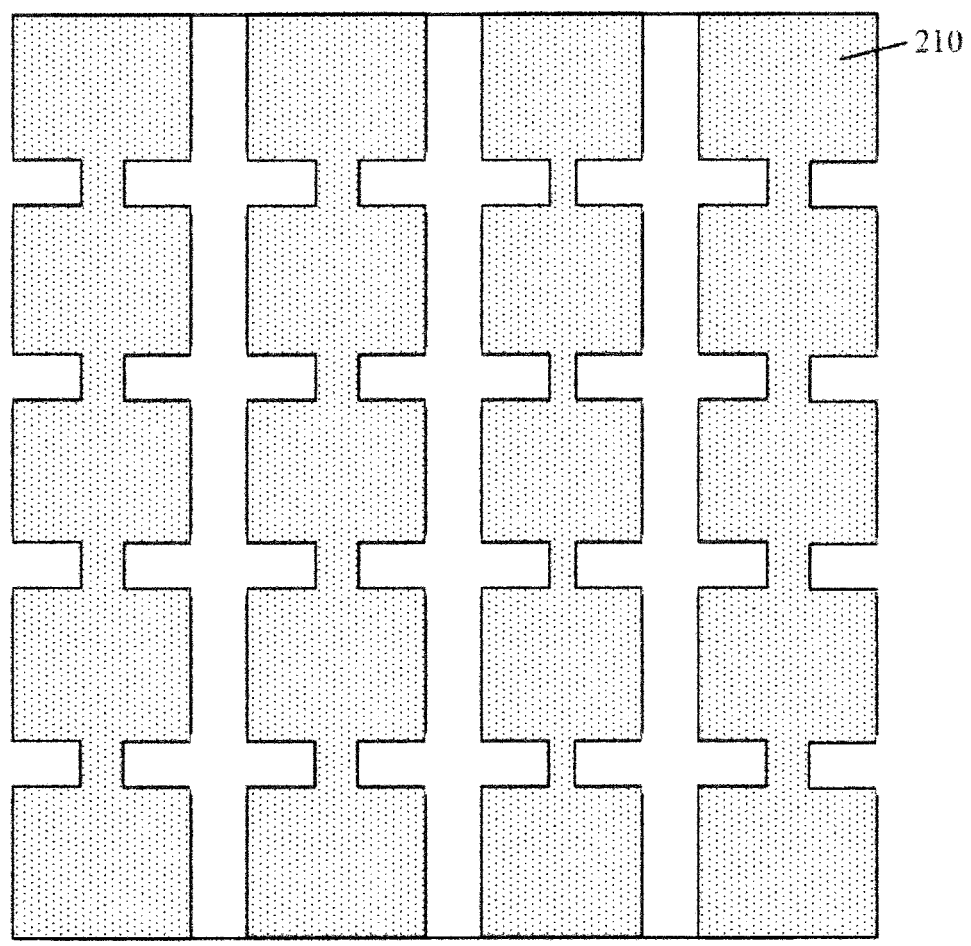
FIG. 4c is a schematic top view of a common electrode according to a further embodiment of the present disclosure.
Figure 4D:
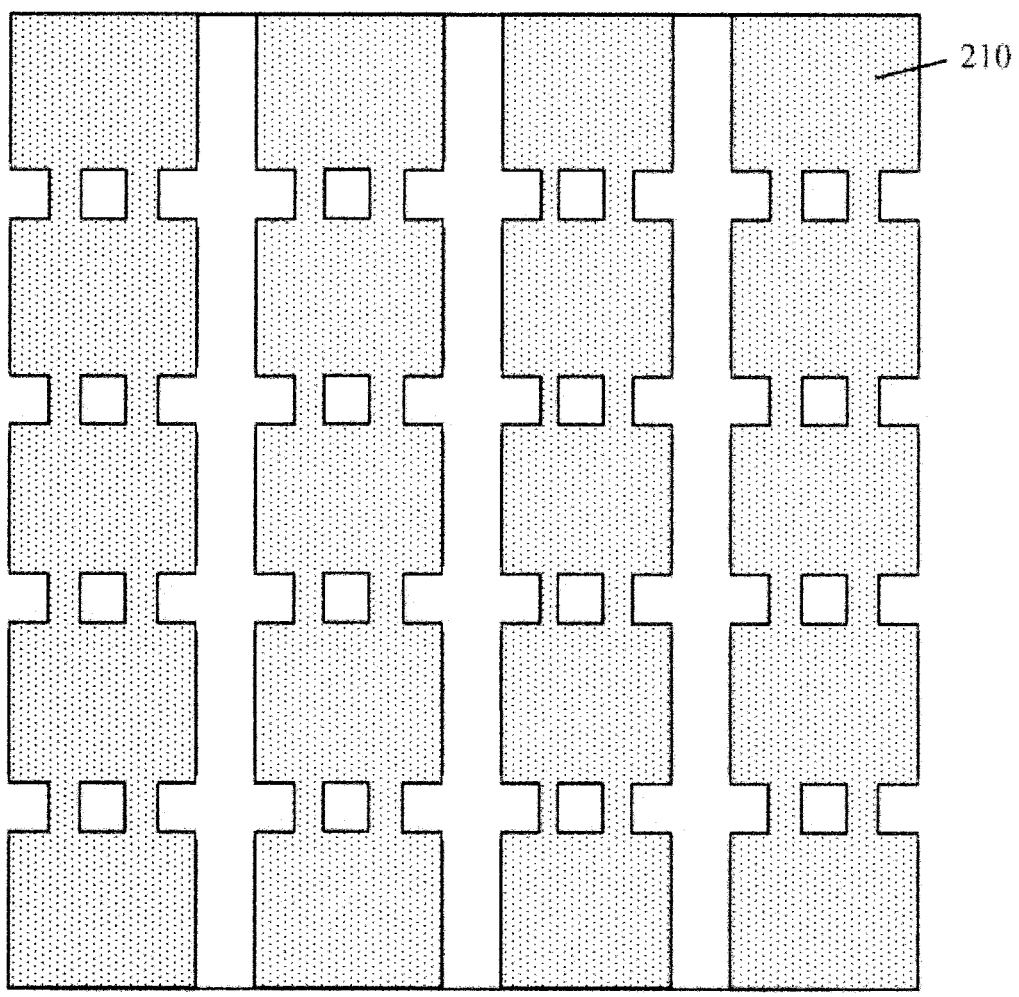
FIG. 4d is a schematic top view of a common electrode according to still another embodiment of the present disclosure.

In a specific implementation, in the liquid crystal display panel according to the embodiments of the present disclosure, as shown in FIG. 4b to FIG. 4d, an orthogonal projection of the common electrode 210 on the first substrate does not overlap an orthogonal projection of the second conductors on the first substrate, the orthogonal projection of the common electrode 210 on the first substrate comprises overlap regions at which the orthogonal projection of the common electrode 210 on the first substrate overlaps an orthogonal projection of the first conductors on the first substrate, and each of the overlap regions has blocky structures distributed uniformly at intervals. The overlap regions of the orthogonal projection of the common electrode on the first substrate, at which the orthogonal projection of the common electrode on the first substrate overlaps the orthogonal projection of the first conductors on the first substrate, have a total area that is less than an area of the orthogonal projection of the first conductors on the first substrate. Of course, alternatively, the orthogonal projection of the common electrode on the first substrate does not overlap the orthogonal projection of the first conductors on the first substrate. Arrangement and configuration of the common electrode are not limited to those described in the embodiments.

In a specific implementation, in the liquid crystal display panel according to the embodiments of the present disclosure, materials for the common electrode and the pixel electrodes are transparent electrically-conductive materials that have a higher refractive index than glass.

In a specific implementation, the liquid crystal display panel according to the embodiments of the present disclosure may be a transparent liquid crystal display panel. The polymer liquid crystal layer corresponding to the display regions is configured to be in a transparent state when no corresponding voltages are applied to the pixel electrodes and the common electrode. Of course, the liquid crystal display panel according to the embodiments of the present disclosure may also be other liquid crystal display panel, and is not limited to those described in the embodiments.

In a specific implementation, in the liquid crystal display panel according to the embodiments of the present disclosure, a material for the plurality of conductors is a metal material. For example, the material for the plurality of conductors may be molybdenum, aluminum, copper, molybdenum-aluminum alloy, and the like, and is not limited to those described in the embodiments.

In actual applications, when the material for the plurality of conductors is the metal material, they will probably reflect ambient light, thereby affecting a displaying effect. In a specific implementation, as shown in FIG. 2a to FIG. 2c, the liquid crystal display panel according to the embodiments of the present disclosure may further comprise: a first light blocking layer 140 located on a side of the plurality of conductors 120 which faces towards the first substrate 100; and a second light blocking layer 150 located on a side of the plurality of conductors 120 which faces towards the polymer liquid crystal layer 300. An orthogonal projection of each of the first light blocking layer 140 and the second light blocking layer 150 on the first substrate 100 covers an orthogonal projection of at least the plurality of conductors 120 on the first substrate 100.

In a specific implementation, in the liquid crystal display panel according to the embodiments of the present disclosure, a material for each of the first light blocking layer and the second light blocking layer may be a material used for a black matrix, for example, polyimide or other resin materials, having carbon black particles. Furthermore, the first light blocking layer and the second light blocking layer are manufactured by a patterning process, the first light blocking layer or the second light blocking layer may have a thickness in the range of 0.1 μm~5 μm, and the first light blocking layer or the second light blocking layer has a width that is 2-4 times as large as a width of each of the conductors. In addition, the first light blocking layer or the second light blocking layer is also disposed in regions of the first substrate which have metal wires, such as regions where a metal wiring, a thin film transistor, a capacitor, and the like are disposed.

In a specific implementation, in the liquid crystal display panel according to the embodiments of the present disclosure, a material for the plurality of conductors is a transparent electrically-conductive material. In this way, provision of the light blocking layer can be avoided so that the number of process steps can be reduced, and transparency of the display can also be improved. For example, the transparent electrically-conductive material may be a metal material having a high transmittance, such as a gold nanowire, a silver nanowire, and the like. Of course, the transparent electrically-conductive material may also be one of indium tin oxide (ITO), indium zinc oxide (IZO), a carbon nanotube and a graphene or a combination of at least two of indium tin oxide (ITO), indium zinc oxide (IZO), a carbon nanotube and a graphene. The transparent electrically-conductive material is not limited to those described in the embodiments.

In a specific implementation, in the liquid crystal display panel according to the embodiments of the present disclosure, as shown in FIG. 2a to FIG. 2c, the first substrate 100 may further comprise a first orientation layer 160, while the second substrate 200 may further comprise a second orientation layer 230.

Furthermore, in the liquid crystal display panel according to the embodiments of the present disclosure, generally, the first substrate is further provided with other structures and films such as a passivation protective layer, a planarization layer made of a high-temperature resistant polymeric material, a thin film transistor, and the like. These structures and films are disposed in the same manners as those of a conventional liquid crystal display panel and thus are no longer described for the sake of brevity.

Based on the same inventive concept, embodiments of the present disclosure also provide a liquid crystal display apparatus comprising: the liquid crystal display panel according to any one of the embodiments of the present disclosure. Implementations of the liquid crystal display panel may be referred to for implementations of the liquid crystal display apparatus and repeated contents are no longer described herein for the sake of brevity.

In a specific implementation, in the liquid crystal display apparatus according to the embodiments of the present disclosure, the polymer liquid crystal layer of the liquid crystal display panel has four sides, and the liquid crystal display apparatus further comprises an edge-lighting type collimated light source located on at least one of the four sides of the polymer liquid crystal layer.

In a specific implementation, the liquid crystal display apparatus according to the embodiments of the present disclosure may be a transparent liquid crystal display apparatus. Other indispensable components of the liquid crystal display apparatus will be understood by those skilled in the art, are no longer described herein for the sake of brevity, and should not be construed to limit the present disclosure.

With the liquid crystal display panel and the liquid crystal display apparatus according to the embodiments of the present disclosure, the liquid crystal molecules of the polymer liquid crystal layer corresponding to the display regions can be irregularly arranged when the corresponding voltages are applied to the pixel electrodes and the common electrode, respectively, to scatter the input light emitted from the edge-lighting type light source, for displaying the image information. Furthermore, in the areas corresponding to the gaps between adjacent ones of the plurality of pixel electrodes, the portions of the polymer liquid crystal layer corresponding to at least the zones where the plurality of conductors are located can transmit the input light emitted from the edge-lighting type light source. Therefore, the input light can pass through the portions of the polymer liquid crystal layer corresponding to at least the zones, and enters the portions of the polymer liquid crystal layer corresponding to the display regions. As a result, scattering of the input light is avoided, and more input light is used for achieving a displaying function in the display regions, thereby improving a display contrast and thus a display effect.

The above embodiments are only used to explain the present invention, and should not be construed to limit the present invention. It will be appreciated by those skilled in the art that various changes and modifications may be made therein without departing from the spirit of the present invention, the scope of which is defined in the appended claims and their equivalents.

What is claimed is:

1. A liquid crystal display panel comprising:
a first substrate and a second substrate which are opposite to each other, the first substrate serving as an array substrate; and
a polymer liquid crystal layer between the first substrate and the second substrate,
wherein the first substrate comprises: a plurality of pixel electrodes in display regions, and a plurality of conductors in gaps between adjacent ones of the plurality of pixel electrodes; the second substrate comprises a common electrode; and liquid crystal molecules of first portions of the polymer liquid crystal layer corresponding to the display regions are configured to be switched from a transmitting state to a scattering state when corresponding voltages are applied to the pixel electrodes and the common electrode, respectively, and in the scattering state, the liquid crystal molecules of the first portions of the polymer liquid crystal layer corresponding to the display regions are irregularly arranged to scatter an input light emitted from an edge-lighting type light source, for displaying image information; and
wherein in areas corresponding to the gaps between adjacent ones of the plurality of pixel electrodes, second portions of the polymer liquid crystal layer corresponding to at least zones where the plurality of conductors are located are configured to be in a transmitting state when the liquid crystal molecules of the first portions of the polymer liquid crystal layer corresponding to the display regions are in the transmitting state, and be maintained in the transmitting state when the liquid crystal molecules of the first portions of the polymer liquid crystal layer corresponding to the display regions are switched from the transmitting state to the scattering state, and the second portions of the polymer liquid crystal layer corresponding to at least the zones where the plurality of conductors are located transmit the input light emitted from the edge-lighting type light source when the second portions of the polymer liquid crystal layer are in the transmitting state,
the liquid crystal display panel further comprising:
a first light blocking layer located on a side of the plurality of conductors which faces towards the first substrate; and
a second light blocking layer located on a side of the plurality of conductors which faces towards the polymer liquid crystal layer,
wherein the first light blocking layer and the second light blocking layer are disposed in a same layer as the plurality of conductors, are located on a same side of the polymer liquid crystal layer, and constitute a surrounding structure surrounding the plurality of conductors, and an orthogonal projection of each of the first light blocking layer and the second light blocking layer on the first substrate completely covers an orthogonal projection of the plurality of conductors on the first substrate.

2. The liquid crystal display panel of claim 1, wherein:
in the areas corresponding to the gaps between adjacent ones of the plurality of pixel electrodes, the second portions of the polymer liquid crystal layer corresponding to at least the zones where the plurality of conductors are located comprise: liquid crystal molecules oriented parallel to the input light, and polymer networks; and the first portions of the polymer liquid crystal layer corresponding to the display regions comprise: liquid crystal molecules oriented perpendicular to the input light, and polymer networks.

3. The liquid crystal display panel of claim 1, wherein:
in the areas corresponding to the gaps between adjacent ones of the plurality of pixel electrodes, the second portions of the polymer liquid crystal layer corresponding to at least the zones where the plurality of conductors are located comprise: liquid crystal molecules regularly arranged and oriented, and photopolymerisable monomer molecules; and the first portions of the polymer liquid crystal layer corresponding to the display regions comprise: liquid crystal molecules oriented perpendicular to the input light, and the polymer networks.

4. The liquid crystal display panel of claim 3, wherein:
the liquid crystal molecules regularly arranged and oriented comprise liquid crystal molecules oriented perpendicular to the input light, or liquid crystal molecules oriented parallel to the input light.

5. The liquid crystal display panel of claim 1, further comprising:
a first ultraviolet ray blocking layer located on a side of the first substrate, wherein an orthogonal projection of the first ultraviolet ray blocking layer on the first substrate completely covers an orthogonal projection of the plurality of conductors on the first substrate; and/or a second ultraviolet ray blocking layer located on a side of the second substrate, wherein an orthogonal projection of the second ultraviolet ray blocking layer on the second substrate completely covers an orthogonal projection of the plurality of conductors on the second substrate.

6. The liquid crystal display panel of claim 5, wherein:
the first ultraviolet ray blocking layer is located on a side of the plurality of conductors which faces towards the polymer liquid crystal layer; and/or the second ultraviolet ray blocking layer is located on a side of the second substrate which faces towards the polymer liquid crystal layer.

7. The liquid crystal display panel of claim 5, wherein:
a material for the first ultraviolet ray blocking layer comprises one of salicylate, benzophenone, benzotriazole, substituted acrylonitrile, triazine, and hindered amine, or a combination of at least two of salicylate, benzophenone, benzotriazole, substituted acrylonitrile, triazine, and hindered amine; and/or a material for the second ultraviolet ray blocking layer comprises one of salicylate, benzophenone, benzotriazole, substituted acrylonitrile, triazine, and hindered amine, or a combination of at least two of salicylate, benzophenone, benzotriazole, substituted acrylonitrile, triazine, and hindered amine.

8. The liquid crystal display panel of claim 1, wherein:
the common electrode has hollowed-out structures in regions corresponding to the plurality of conductors.

9. The liquid crystal display panel of claim 8, wherein:
the plurality of conductors comprise first conductors extending in a first direction and second conductors extending in a second direction; and an orthogonal projection of the common electrode on the first substrate does not overlap an orthogonal projection of the first conductors on the first substrate, and/or the orthogonal projection of the common electrode on the first substrate does not overlap an orthogonal projection of the second conductors on the first substrate.

10. The liquid crystal display panel of claim 9, wherein:
the first direction is perpendicular to the second direction.

11. The liquid crystal display panel of claim 8, wherein:
the plurality of conductors comprise first conductors extending in a first direction and second conductors extending in a second direction; and an orthogonal projection of the common electrode on the first substrate does not overlap an orthogonal projection of the first conductors on the first substrate, the orthogonal projection of the common electrode on the first substrate comprises overlap regions at which the orthogonal projection of the common electrode on the first substrate overlaps an orthogonal projection of the second conductors on the first substrate, and each of the overlap regions has blocky structures distributed uniformly at intervals; and/or an orthogonal projection of the common electrode on the first substrate does not overlap an orthogonal projection of the second conductors on the first substrate, the orthogonal projection of the common electrode on the first substrate comprises overlap regions at which the orthogonal projection of the common electrode on the first substrate overlaps an orthogonal projection of the first conductors on the first substrate, and each of the overlap regions has blocky structures distributed uniformly at intervals.

12. The liquid crystal display panel of claim 11, wherein:
the overlap regions of the orthogonal projection of the common electrode on the first substrate, at which the orthogonal projection of the common electrode on the first substrate overlaps the orthogonal projection of the second conductors on the first substrate, have a total area that is less than an area of the orthogonal projection of the second conductors on the first substrate; and/or the overlap regions of the orthogonal projection of the common electrode on the first substrate, at which the orthogonal projection of the common electrode on the first substrate overlaps the orthogonal projection of the first conductors on the first substrate, have a total area that is less than an area of the orthogonal projection of the first conductors on the first substrate.

13. The liquid crystal display panel of claim 1, comprising a transparent liquid crystal display panel.

14. The liquid crystal display panel of claim 1, wherein:
a material for the plurality of conductors comprises a transparent electrically-conductive material.

15. A liquid crystal display apparatus comprising:
the liquid crystal display panel according to claim 1.

16. The liquid crystal display apparatus of claim 15, wherein:
the polymer liquid crystal layer of the liquid crystal display panel has four sides, and the liquid crystal display apparatus further comprises an edge-lighting type collimated light source located on at least one of the four sides of the polymer liquid crystal layer.

* * * * *